US012104289B2

(12) United States Patent
Engels et al.

(10) Patent No.: US 12,104,289 B2
(45) Date of Patent: Oct. 1, 2024

(54) CARDER, WEB GUIDING ELEMENT, SPINNING MILL PREPARATION INSTALLATION AND METHOD FOR IDENTIFYING UNDESIRED PARTICLES

(71) Applicant: Trutzschler Group SE, Mönchengladbach (DE)

(72) Inventors: Guido Engels, Rommerskirchen (DE); Jürgen März, Düsseldorf (DE)

(73) Assignee: TRÜTZSCHLER GROUP SE, Monchengladbach (DE)

( * ) Notice: Subject to any disclaimer, the term of this patent is extended or adjusted under 35 U.S.C. 154(b) by 194 days.

(21) Appl. No.: 17/615,774

(22) PCT Filed: May 5, 2020

(86) PCT No.: PCT/EP2020/062418
§ 371 (c)(1),
(2) Date: Dec. 1, 2021

(87) PCT Pub. No.: WO2020/244867
PCT Pub. Date: Dec. 10, 2020

(65) Prior Publication Data
US 2022/0251737 A1 Aug. 11, 2022

(30) Foreign Application Priority Data

Jun. 5, 2019 (DE) .................... 10 2019 115 138.4

(51) Int. Cl.
*D01G 31/00* (2006.01)
*G01N 21/89* (2006.01)
*G01N 21/88* (2006.01)

(52) U.S. Cl.
CPC ....... *D01G 31/003* (2013.01); *G01N 21/8915* (2013.01); *G01N 2021/8848* (2013.01)

(58) Field of Classification Search
CPC ............ D01G 31/003; G01N 21/8915; G01N 2021/8848
See application file for complete search history.

(56) References Cited

U.S. PATENT DOCUMENTS 4,953,265 A * 9/1990 Scheinhutte ......... D01G 31/003
19/106 R
5,125,514 A * 6/1992 Oehler ................. D01G 31/003
367/87

(Continued)

FOREIGN PATENT DOCUMENTS

CN 101619537 A * 1/2010 ........... B07C 5/3427
CN 108796681 A 11/2018

(Continued)

OTHER PUBLICATIONS

International Search Report in corresponding International Patent Application No. PCT/EP2020/062418, mailed Nov. 26, 2020, 13 pages with Google English Translation.

(Continued)

*Primary Examiner* — Shaun R Hurley
(74) *Attorney, Agent, or Firm* — FisherBroyles, LLP; Robert Kinberg

(57) ABSTRACT

The invention relates to a card with a device for recognizing interfering particles, in particular trash parts, neps, shell neps, thick spots and/or foreign parts in a carded fibre web. The device comprises at least one sensor stationarily disposed in a web guiding element, which is disposed at the transition from a doffer to a stripper roll. The at least one sensor detects the fibre web on the doffer.

11 Claims, 5 Drawing Sheets

(56) References Cited

U.S. PATENT DOCUMENTS

| | | | | | |
|---|---|---|---|---|---|
| 5,130,559 | A | * | 7/1992 | Leifeld | D01G 31/003 19/65 A |
| 5,598,266 | A | * | 1/1997 | Cornuejols | D01G 31/00 250/559.46 |
| 5,642,553 | A | * | 7/1997 | Leifeld | D01G 31/006 19/112 |
| 5,692,267 | A | * | 12/1997 | Leifeld | D01G 31/003 19/106 R |
| 5,974,629 | A | * | 11/1999 | Leifeld | G01N 33/362 19/106 R |
| 6,936,836 | B2 | * | 8/2005 | Hosel | D01G 31/006 250/559.46 |
| 7,440,106 | B2 | * | 10/2008 | Engels | D01G 31/003 356/429 |
| 2004/0070847 | A1 | * | 4/2004 | Hartmeier | G01N 21/8915 359/798 |

FOREIGN PATENT DOCUMENTS

| | | | | |
|---|---|---|---|---|
| DE | 19604499 | B4 | 10/1996 | |
| DE | 10347240 | A1 | 5/2005 | |
| DE | 102013010468 | A1 | 12/2014 | |
| EP | 0331039 | A2 | 9/1989 | |
| EP | 0606626 | A1 | 7/1994 | |
| EP | 1057907 | A1 | 12/2000 | |
| EP | 1207388 | A1 | 5/2002 | |
| EP | 1233086 | A1 | 8/2002 | |
| GB | 2461967 | A * | 1/2010 | D01B 3/02 |
| WO | 9950486 | A1 | 10/1999 | |
| WO | WO2014206508 | A1 | 12/2014 | |

OTHER PUBLICATIONS

First Office Action, Brazilian Application No. BR112021023644-9, May 20, 2024, pp. 1-3.

* cited by examiner

CARDER, WEB GUIDING ELEMENT, SPINNING MILL PREPARATION INSTALLATION AND METHOD FOR IDENTIFYING UNDESIRED PARTICLES

CROSS-REFERENCE TO RELATED APPLICATIONS

This application is a United States National Stage Application of International Application No. PCT/EP2020/062418 filed May 5, 2020, claiming priority from German Patent Application No. 10 2019 115 138.4 filed Jun. 5, 2019.

FIELD OF THE INVENTION

The invention relates to a card with a device for recognizing interfering particles, in particular trash parts, neps, shell neps, thick spots and/or foreign parts in a carded fibre web, wherein the device comprises at least one sensor. The invention also relates to a web guiding element, a spinning mill preparation installation and a method for recognizing interfering particles, in particular trash parts, neps, shell neps, thick spots and/or foreign parts in a carded fibre web.

BACKGROUND

According to the state-of-the-art, it is known in the field of textile technology to detect neps, interfering particles or dirty pieces in a web, sliver or yarn. The known methods differ with regard to the accuracy of determined values and reliability in the everyday operation of a spinning mill, because the components must constantly well operate even with considerable soiling or under temperature load. Detecting neps or knots of fibres can be done in the laid out fibre web or in sliver with different methods. When detecting sliver, extensive measuring devices are necessary, because generally it is not possible to view from outside into the sliver. Therefore, it is established to perform detecting neps or knots underneath the doffer or after the doffer. In this case, neps or knots are not absolutely counted, but just a partial area of the fibre web is detected, and then statistical evaluation allows for making conclusions for the entire production quantity.

German patent document DE 19604499 B4 discloses a sensor for detecting neps and similar interfering particles, which is disposed in a web guiding profile movable back and forth across the working width of the card. The concave surface of the web guiding profile, which is disposed towards the stripper roll, has an at least partially transparent wall, through which the sensor detects the fibres. The web the doffer doffs off is continuously, yet not contacting, guided over said transparent wall, which, in operation, results in quick soiling and has a negative impact on the measuring result. Short-term cleaning of the web guiding element requires completely stopping the card, namely stopping both feeding fibre tufts and reducing the rotational speed to zero of the rotating components. It is only then that the web guiding profile can be cleaned. Said interruption of the carding operation is not desired and reduces the possible production performance. Another disadvantage is the displaceable arrangement of the sensor in the web guiding profile, what is expensive to manufacture and, based on the cables trailing during displacement, susceptible to faults.

SUMMARY

Accordingly, an object of the invention is to further develop a card in that recognizing interfering particles, in particular trash parts, neps, shell neps, thick spots and/or foreign parts in a carded fibre web can be performed at an increased service time and a higher accuracy.

Furthermore, it is an object of the invention to form a spinning mill preparation installation in that can be recognized interfering particles, in particular trash pieces, neps, shell neps, thick spots and/or foreign parts in a carded fibre web in a very short period of time.

The above and other objects of the invention are achieved with a web guiding element disposed in a card, a spinning mill preparation installation and a method of capturing trash or foreign parts as described in more detail below.

A card according to the present invention comprises a device for recognizing interfering particles, in particular trash parts, neps, shell neps, thick spots and/or foreign parts in a carded fibre web, wherein the device comprises at least one sensor, which is stationarily disposed in a web guiding element, which is disposed at the transition from a doffer to a stripper roll, wherein the at least one sensor detects the fibre web on the doffer. As the sensor detects the fibre web, which is between the teeth of the clothing of the doffer, there is less soiling of the area, which the sensor rays have to pass through. Thereby, the fibre web just barely touches the almost vertical front side of the web guiding element, which therefore soils considerably less than the horizontal concave upper side. On account of said upright almost vertically arranged front side opposite the doffer, less soiling particles deposit on said side during operation than according to the state-of-the-art. The gap between the web guiding element and the doffer is embodied very narrow so that the fibre web partially touches the vertical front side of the web guiding element and thereby the continuous material flow cleans said area. The result is a longer service time, until the web guiding element or a light transmissible element, which the sensor rays pass through, needs cleaning. Not a single sensor is displaceably disposed within the web guiding element, but at least one sensor is disposed stationarily within the web guiding element, thus preventing any incident because of broken trailing cables.

In an advantageous embodiment, the web guiding element has a front side disposed towards the doffer with at least one light-transmissible element. The light-transmissible element can be disposed only in the detection area of the sensor, or as an alternative, can extend across the working width of the card, for example as a transparent wall of the front side of the web guiding element.

Advantageously, a polarizing filter is disposed within the web guiding element at the light-transmissible element. The polarizing filter is formed for circular polarization, so that the sensor rays, which are reflected from the clothing of the doffer, are blanked out. Thereby, the sensor just recognizes the foreign parts, neps and interfering particles in the fibres of the fibre web. Disposing the polarizing filter at the light-transmissible element simplifies evaluating the measured data, in particular the polarizing filter reduces the requirements on the algorithmics and the computing capacity of the computer.

As at least three sensors, preferably at least five sensors, particularly preferred at least nine sensors are stationarily disposed within the web guiding element, the accuracy and the time for evaluation can be influenced with a larger amount of data. The number of sensors depending on the customer wishes allows for finding a compromise between accuracy in recognizing particles and cost of the device.

In a preferred embodiment, each sensor has a sensor board with an image detection sensor and a lens, wherein a computer, a carrier board and an illumination unit are disposed between the sensor board and the polarizing filter.

Such a structured sensor allows for achieving as wide as possible a distance of the sensor board to the fibre web, which, otherwise in this small construction space, could only be achieved with a mirror deflecting the sensor rays.

In this case, the lens of the sensor passes through a board with the computer, the carrier board and the illumination unit. Thereby is realized an inversed structure of a sensor, as known in the state-of-the-art, wherein, in this small construction space, the sensor is disposed at the greatest possible distance to the object to be detected.

Preferably, the carrier board is formed for protecting the computer and the sensor board from electromagnetic radiation. Thereby, the computer and the sensor board do not have to be separately encapsulated any more. For this purpose, the carrier board is made from metal, for example.

The computer is formed for evaluating the image data of the image capture sensor with algorithms. The detected interfering particles are classified and counted, respectively statistically registered. In this case, classifying can not only contain the type of interfering particles, i.e. neps, shell neps, trash particles, foreign parts and the type of foreign parts, but also further properties such as size, contour, structure, colour or surface quality. Furthermore, based on the image data, it is possible to determine characteristics on the fibres or the fibre fleece, such as cloudiness, thin spots, thick spots, structure, orientation of the fibres or content of short fibres. A superordinate control is able to automatically use said information for optimizing in a targeted manner, e.g. the card or else the machines in the cleaning room, e.g. the foreign parts separator, for reducing the interfering parts content or for optimizing the fibre characteristics. Thereby, the inventive web guiding element becomes the measuring element of a closed loop control, for regulating or optimizing the operating parameters of the card itself or of the feeding machines. Thereby, the machines adapt in an automated manner to changing start materials or to changed marginal or processing conditions so as to achieve a constant quality of the output material of the card.

Determining the information for optimizing the machines is time consuming. On the one hand, the computing algorithms are time consuming, however, on the other hand, in particular determining the content of interfering particles in foreign parts requires evaluating so many more individual images than for determining for example neps, shell neps or trash particles.

Preferably therefore, each sensor of a web guiding profile has its own associated computer, which adds up or combines the results of the individual sensors. Using at least two sensors realizes parallel collection and evaluation of sensor data. Combining the results of all sensors within the inventive web guiding profile thus allows for determining considerably faster the content of interfering particles or the fibre characteristics. In this case, combining the results of the sensors is done in a predetermined manner, e.g. by adding up, finding average values, statistical evaluation, classification, pattern analysis or methods of artificial intelligence. For this purpose, depending on the quantity, a further computer can be used within the web guiding profile, which computer can also engage in communication of the web guiding element with the card or the other machines of the spinning mill preparation installation.

The inventive web guiding element is formed for guiding the fibre web in a card from a doffer to a stripper roll. In this case, there is disposed within the web guiding element at least one stationarily disposed sensor for detecting interfering particles, in particular trash parts, neps, shell neps, thick spots and/or foreign parts, wherein the at least one sensor detects the interfering particles in the carded fibre web on the doffer. The invention is advantageous in that, for detecting the interfering particles, a side of the web guiding element is used on which no fibres or dirt can deposit based on gravity. Thereby making detecting the neps, foreign parts etc. more reliable and extending the service time until cleaning.

In an advantageous embodiment, the web guiding element has a front side disposed towards the doffer with at least one light-transmissible element. The light-transmissible element can be disposed only in the detection area of the sensor, or as an alternative, can extend across the working width of the card.

The inventive spinning mill preparation installation comprises a least one cleaning or opening line with at least one controllable machine, e.g., a foreign parts separator or a blender or cleaner, as well as at least one card, wherein the at least one card includes at least one sensor for detecting in the carded fibre web interfering particles, in particular trash parts, neps, shell neps, thick spots and/or foreign parts.

The invention is characterized in that the sensor data of the at least one card are combined and evaluated in a control, wherein at least one reference variable for the fibre quality is input to the control via an input module and the control transmits at least one manipulated variable to a control of a machine of the blow room and opening line. The machine of the blow room and opening line can be a foreign parts separator or blender or cleaner, for example. The transmitted manipulated variable can be detection sensitivity of the foreign parts separator or the blending ratio of different fibres in the blender, for example. Evaluating the data of the web guiding element of a card in a control, superordinate to the spinning mill preparation installation, can influence on the setting of individual machines of the spinning mill preparation installation so that thereby creating a closed loop control.

Advantageously, combining the results of the sensor data of at least two cards is done in a predetermined manner e.g., by adding up, finding average values, statistical evaluation, classification, pattern analysis or with methods of artificial intelligence. Depending on the quantity, a further computer can be used within the spinning mill preparation, which can also engage in communication with the machines to be controlled of the spinning mill preparation installation. Combining the data of at least two cards allows for collecting a larger amount of data in a shorter period of time than would be possible with data of only one card. The time for evaluating the fibre quality is considerably reduced. Herein again, for example, determining the number of neps or a qualitative statement on the proportion of short fibres is done via a superordinate control in the spinning mill preparation installation by means of statistical evaluation. Evaluating the data from several cards increases the number of measured values so that in a very short period of time, the machine operator receives potentially also a warning about a faulty production, prior to continuing treating the produced sliver in the next treatment stage.

Preferably, the control is formed for illustrating on a display screen the combined and evaluated sensor data according to specified criteria.

In a further embodiment, the superordinate control for combining and evaluating the data of the at least one card and for determining the manipulated variables is concorporated in the control of the machine to be controlled, wherein cards can query said detailed data via corresponding data transmission channels from the cards or the inventive web guiding elements.

For this purpose, with a faulty fibre web, the control is formed for issuing a visual, acoustic or electric signal so that the next treatment step, for example drafting, combing or producing roving, is interrupted or does not start at all.

DESCRIPTION OF THE DRAWINGS

Hereinafter, further measures improving the invention are illustrated in more detail together with the description of a preferred exemplary embodiment of the invention based on the Figures.

In the following, FIGS. 1 to 5 are explained in more detail in connection with preferred embodiments of an inventive card 100. The same features in the drawing are respectively identified with the same reference numerals. At this point, the drawing is understood to be illustrated just in a simplified manner and in particular without being to scale.

DETAILED DESCRIPTION

Figure 1:
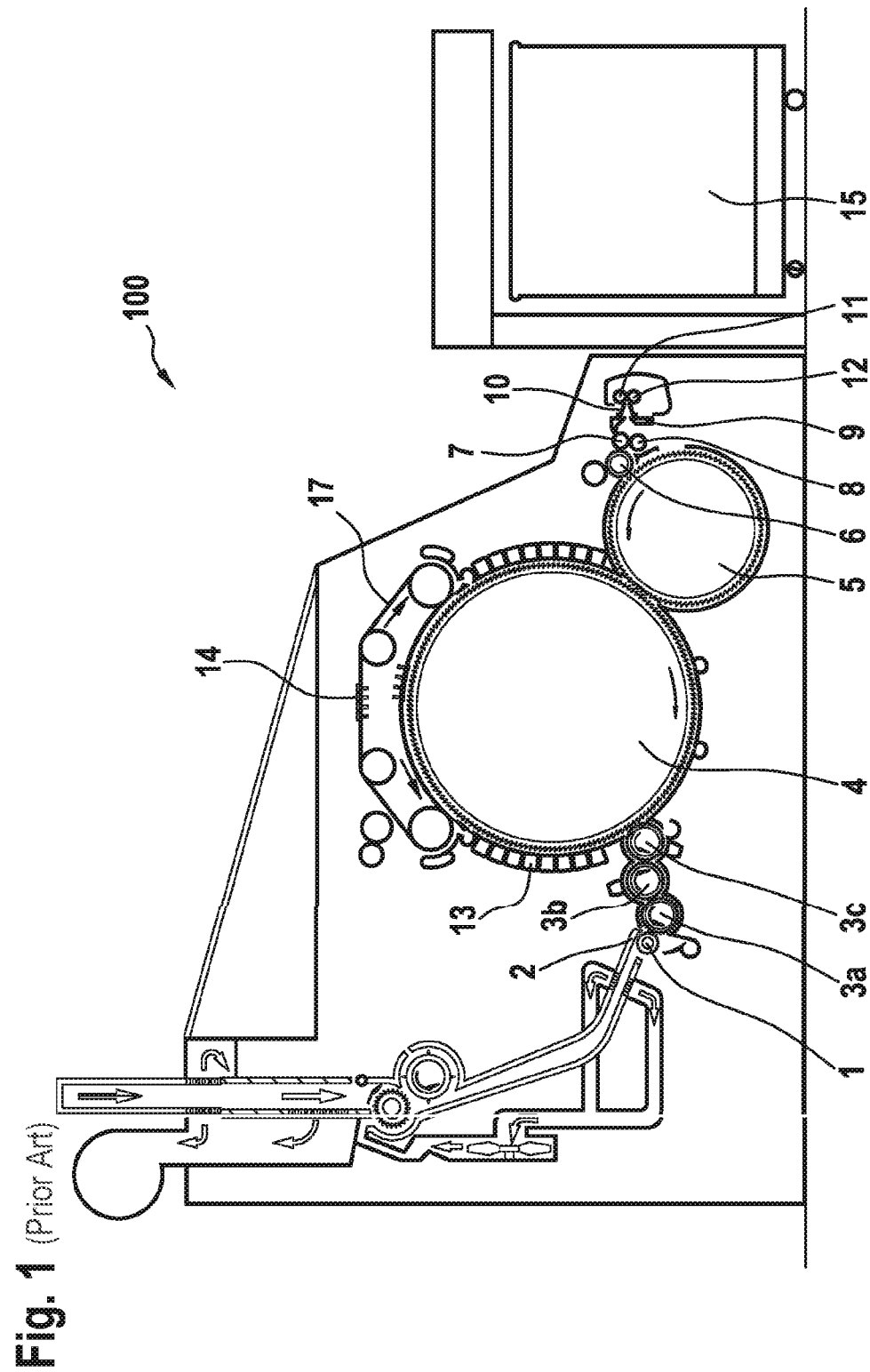
FIG. 1 is a diagrammatic lateral view of a spinning preparation machine, in the shape of a card, in which the inventive device is used.

FIG. 1 shows a card 100 according to the state-of-the-art, in which fibre tufts are guided via a chute to a feed roll 1, a feed table 2, over several lickers-in 3a, 3b, 3c, to the drum 4 or to the main cylinder. On the drum 4, the fibres of the fibre tufts are parallelized and cleaned by means of stationary carding elements 13, suction hoods and mote knives and by means of circulating carding elements, which are formed as flat bars 14 and disposed at a revolving card flat system 17. Subsequently, the resulting fibre web 16 is conveyed over a doffer 5, a stripper roll 6 and several squeezing rolls 7, 8 to a web guiding element 9, which, with a funnel 10, transforms the fibre web to sliver, which in turn, via delivery rolls 11, 12, is transferred to a subsequent processing machine or to a can 15. Setting the flat bars 14 and the carding elements 13 with regard to the drum 4 (carding clearance) is realized via herein not illustrated slide bars, which can include elements, which are oriented in a wedge-shape opposite each other.

Figure 2:
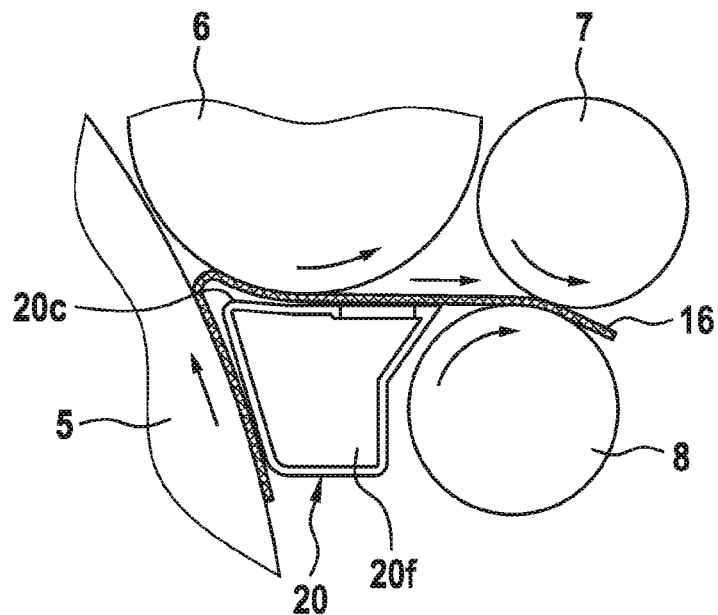
FIG. 2 is an enlarged illustration of an installed web guiding element.
Figure 2A:
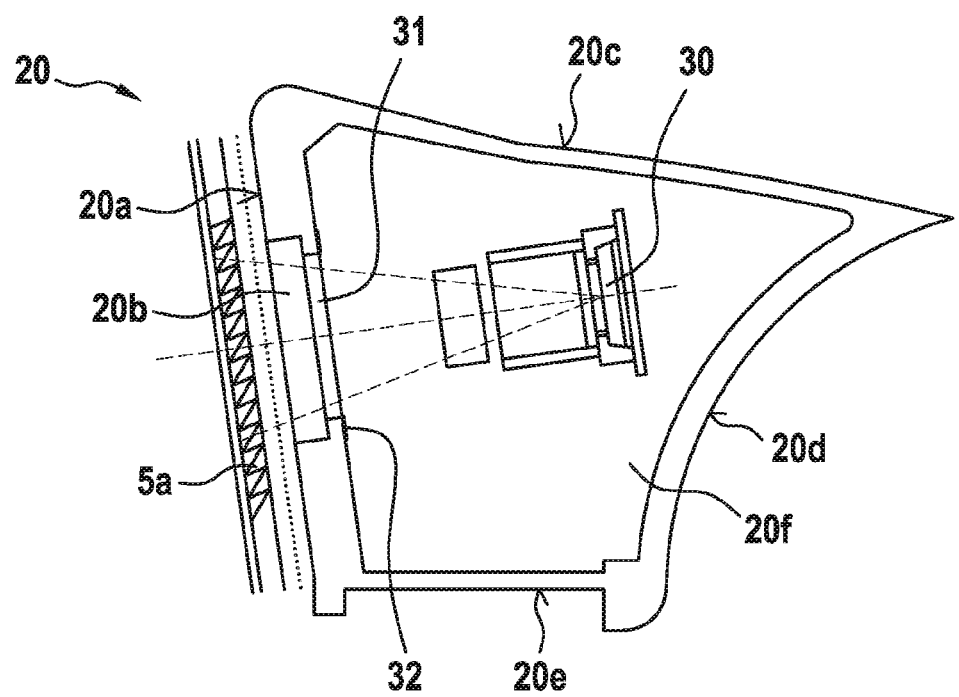
FIG. 2a is a detailed illustration of the web guiding element.
Figure 3:
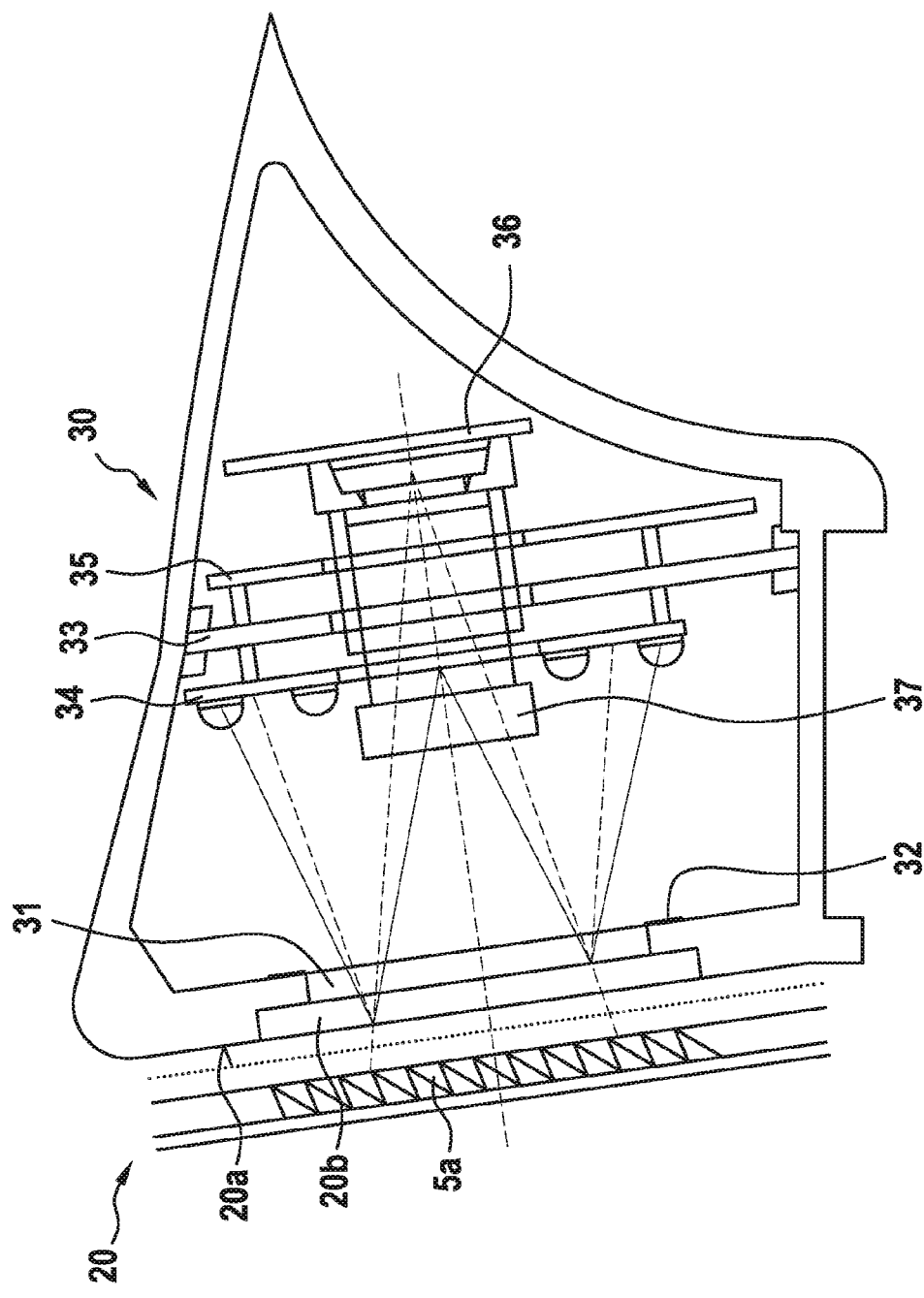
FIG. 3 is a lateral illustration of the sensor in the web guiding element.

FIGS. 2 and 2a illustrate an arrangement according to the invention in which a web guiding element 20 is disposed between the doffer 5, the stripper roll 6 and a squeezing roll 7, in that the stripper roll 6 doffs the fibre web 16 off of the doffer 5 and the fibre web is guided along a concave top side 20c of the web guiding element 20 to the funnel 10. Essentially, four sides 20a, 20c, 20d, 20e form the web guiding element 20 and enclose a hollow space 20f. The front side 20a includes at least one partially light-transmissible element 20b, which is formed for allowing for the detecting area or the viewing area of a sensor 30, which is located in the hollow space 20f, on the fibre web 16 located in the clothing 5a of the doffer 5. The light-transmissible element 20b can only be disposed in the area of the viewing angle of a sensor 30, or as a continuous light-transmissible element 20b extend at least partially or completely across the working width of the card 100. Thereby, the front side 20a of the web guiding element 20 is oriented at a small distance to the surface of the doffer 5. The concave top side 20c of the web guiding element 20 guides the fibre web 16 from the stripper roll 6 to the squeezing rolls 7, 8. One difference to the state-of-the-art is found in that the sensor 30 detects the fibre web 16, which is still in the teeth of the clothing 5a of the doffer 5. Thereby, the fibre web 16 touches the almost vertically disposed front side 20a of the web guiding element 20 and thereby also continuously moves over the light-transmissible element 20b, which thereby soils considerably less than the horizontally disposed concave top side 20c. According to the state-of-the-art the light-transmissible element was disposed in the horizontally disposed concave top side 20c, which the fibre web 16 did not touch on the entire surface, whereby dirt could deposit. The result is a longer service time, until the web guiding element 20 or the light-transmissible element 20b needs cleaning. Not a single sensor 30 is displaceably disposed within the web guiding element 20 any more, but at least one sensor 30 is disposed stationarily. When arranging several stationary sensors 30 within the web guiding element, they are disposed at a regular distance to each other. The light-transmissible element 20b can be formed as a glass or plastic material pane behind which the polarizing filter 31 is disposed. Thus, the polarizing filter 31 is disposed between the light-transmissible element 20b and the sensor 30. The polarizing filter 31 is formed for circular polarization, whereby masking the reflecting rays of the sensor 30, which are reflected from a shiny surface, for example from the metal clothing. However, the reflection of the rays from the mat fibres or interfering particles remains visible for the sensor 30. Thus, the sensor 30 only detects the fibres and the interfering particles of the fibre web 16 contained therein and thus can recognize thick spots or knots, neps, shell neps or else foreign parts via the evaluated images. For this purpose, white light is generated with which, combined with the polarizing filter, the clothing 5a can be blanked out. Within the web guiding element 20, a reference film 32 frames the polarizing filter 31 and can perform white balance. In FIG. 2a, the illustration of the sensor 30 is just diagrammatic. The structure of the sensor 30 is described in detail in FIG. 3.

Incorporating an inexpensive sensor for image processing requires a minimum distance of the sensor to the object to be monitored. If said distance cannot be realized due to too narrow a construction space, deflecting mirrors may be used, which, however, entrains the disadvantage of uncontrolled soiling, as well as to require precise adjusting of the mirror. This is the reason why the herein used sensor 30 is newly configured and starts at a carrier board 33, at which the other components are fastened with a distance. The carrier board 33 is stationarily disposed within the web guiding element 20, for example at non-identified shoulders or grooves of the top side 20c and bottom side 20e. Starting at the carrier board 33, an illumination unit 34 is disposed towards the light-transmissible element 20b and can be formed as an LED-board. The illumination unit 34 is likewise formed as a plate-shaped component, on which the LEDs or other lighting elements are disposed. Potentially, the LEDs can be combined with further herein not illustrated lenses or lens arrays. The illumination unit 34 is disposed parallel to the carrier board 33. A computer 35, which can instantly evaluate the collected data, is disposed behind the carrier board 33 on a board. Forming each sensor 30 with its own computer 35 achieves parallel processing of the determined data so that the determined values are available faster. Seen from the carrier board 33 behind the board with the computer 35, is disposed the sensor board 36, which thereby in this construction space has the maximum distance to the fibres to be detected. For example, the sensor board 36 can be formed as a CCD or CMOS sensor allowing for capturing individual images.

Figure 4:
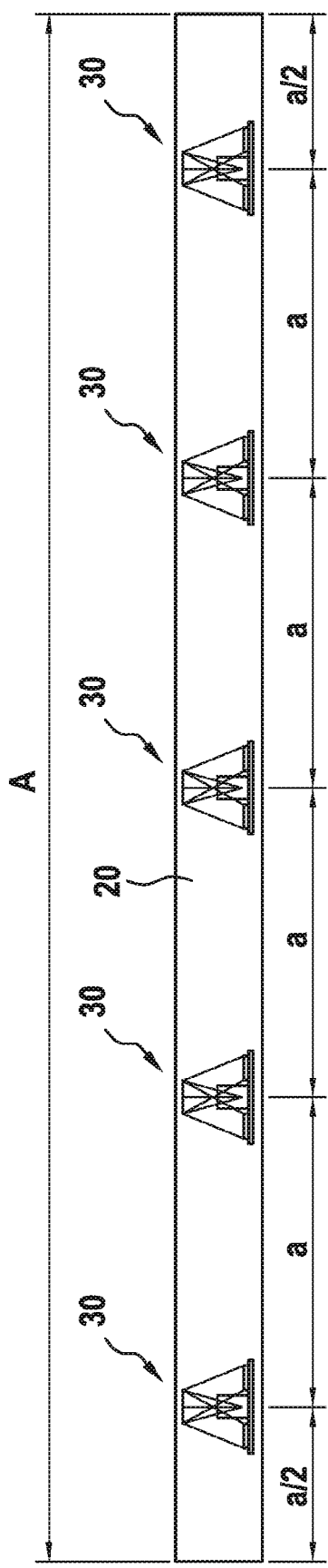
FIG. 4 is a first exemplary embodiment of a sensor arrangement in a web guiding element.
Figure 4A:
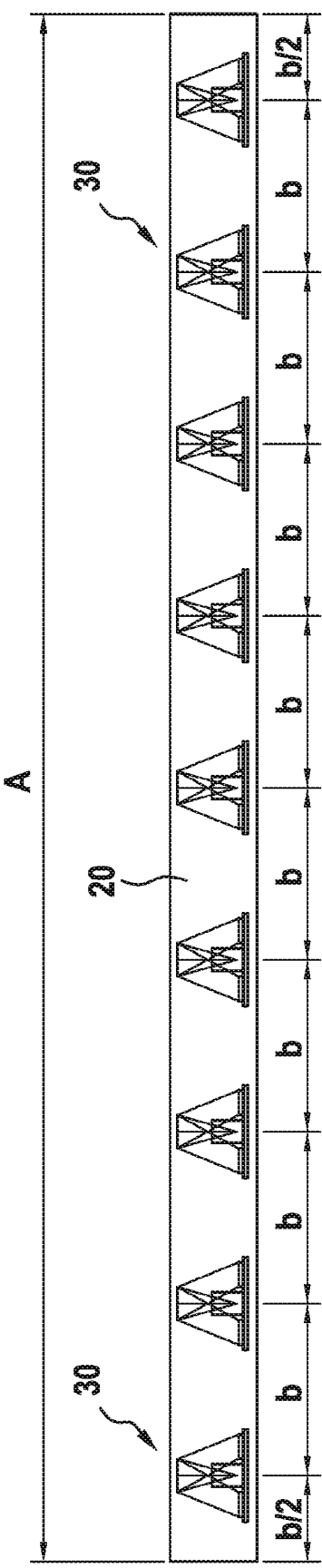
FIG. 4a is a second exemplary embodiment of a sensor arrangement in a web guiding element.

So as to be able to dispose the sensor board 36 with a lens 37 in said small construction space, the board for the computer 35, the carrier board 33 and the illumination unit 34 have a non-identified opening all in alignment, through which the lens 37 passes. According to the state-of-the-art, at least the computer 35 is disposed behind the sensor board 36, namely on the opposite side to the lens 37. By means of bolts or spacers, all components (34, 35, 36) are aligned parallel to the carrier board 33 and attached thereto. As the lens 37 penetrates the computer board 35, the carrier board 33 and the illumination unit 34, the sensor board 36 can be disposed in said construction space, without using a mirror, at a maximum distance to the fibres to be detected. Advantageously, the carrier board 33 is formed for protecting the computer 35 and the sensor board 36 from inadmissible high electromagnetic radiation. When capturing an image, in flash mode, the illumination unit 34 operates at a very high amperage for a short period of time, whereby, for example, a metal carrier board 33 shields the computer 35 and the sensor board 36 from the arising electromagnetic radiation. In FIG. 4, within the web guiding element 20, for example five sensors 30 are preferably regularly distributed at a distance a across the working width A of the card. A width of the drum 4 of 1280 mm, for example, results in a working width A of about 1180 mm, which five sensors detect having each a detection width of 20 to 30 mm. Thereby, during the evaluation of the control of the card each sensor has its own track, which is detected. With stationary sensors 30, for a width of the drum 4 of 1000 mm, a minimum number of three sensors 30 has proven advantageous within the web guiding profile 20, with which the nep count can be determined at sufficient accuracy. With regard to the cost of the sensors 30 and the width of the drum 4, the arrangement of five sensors 30 has proven optimal, with which the nep count can be determined at very high accuracy. Preferably, within the web guiding element 20, the five sensors 30 are stationarily disposed at the same distance a across the working width A of the card. For detecting the neps, about 10,000 images have to be determined and evaluated via the sensors per measuring value. In a carding production of for example 80 kg/h, a measuring value is a quantity of fibre web 16 of 100 meters passing through on the doffer 5, from which quantity about 10,000 images are captured. At irregular width distribution, the number of tracks, in this case with five sensors 30, allows for determining a sliver nep average value with an error rate of 3%. When using only three sensors 30, the error rate of the sliver nep average value increases to 12%. When using nine sensors 30 (FIG. 4*a*), which are disposed at a distance b to each other, the error rate of the sliver nep average value decreases to 1%. Using a high number of sensors 30 not only increases the accuracy when determining the neps, but also reduces the time for determining the measuring value, because more images are simultaneously captured and the computers 35 process them simultaneously in parallel. For example, the measuring time with three sensors 30 is about 40 seconds, with five sensors 30 about 30 seconds, and with nine sensors 30 about 15 seconds. Based on the limited construction space within the web guiding element 20 at a drum width of 1000 mm to 1500 mm, the arrangement of three to nine stationarily disposed sensors has proven optimal for determining the neps. On the one hand, there is sufficient construction space for distributing the sensors 30 across the working A, on the other hand, sufficient accuracy is guaranteed in combination with a measuring speed, and last but not least, the cost is affordable.

Even, if in this exemplary embodiment, only a regular distance a, b of the sensors 30 to each other is illustrated, the distance can be irregular as well. Then the evaluation algorithm of the data has to be adapted, if required. Therefore, it can be advantageous to dispose the sensors 30 from the centre of the fibre web 16 at a greater or smaller distance to each other, because, based on the specific card construction, the capturing of certain neps, thick spots or foreign parts can be greater in the border area (because of lateral flow) or in the centre of the fibre web 16 (because of differences in the carding clearance across the drum width).

In case the sensors 30 are to be used as well for capturing foreign parts, all sensors 30 together have to determine about 25,000,000 images. Accordingly, when using five sensors 30 in a web guiding element 20, each sensor must produce 5,000,000 images, until a reliable statement is possible on the presence of foreign parts. Thus, having to detect a corresponding quantity of fibre web, whereby the measuring procedure including evaluation drags on to about 18 hours. Using nine sensors 30 results in a measuring and evaluation time of still 10 hours, which means that the card production is at least in the processing stage of roving and needs to be destroyed, when discovering a serious error.

Figure 5:
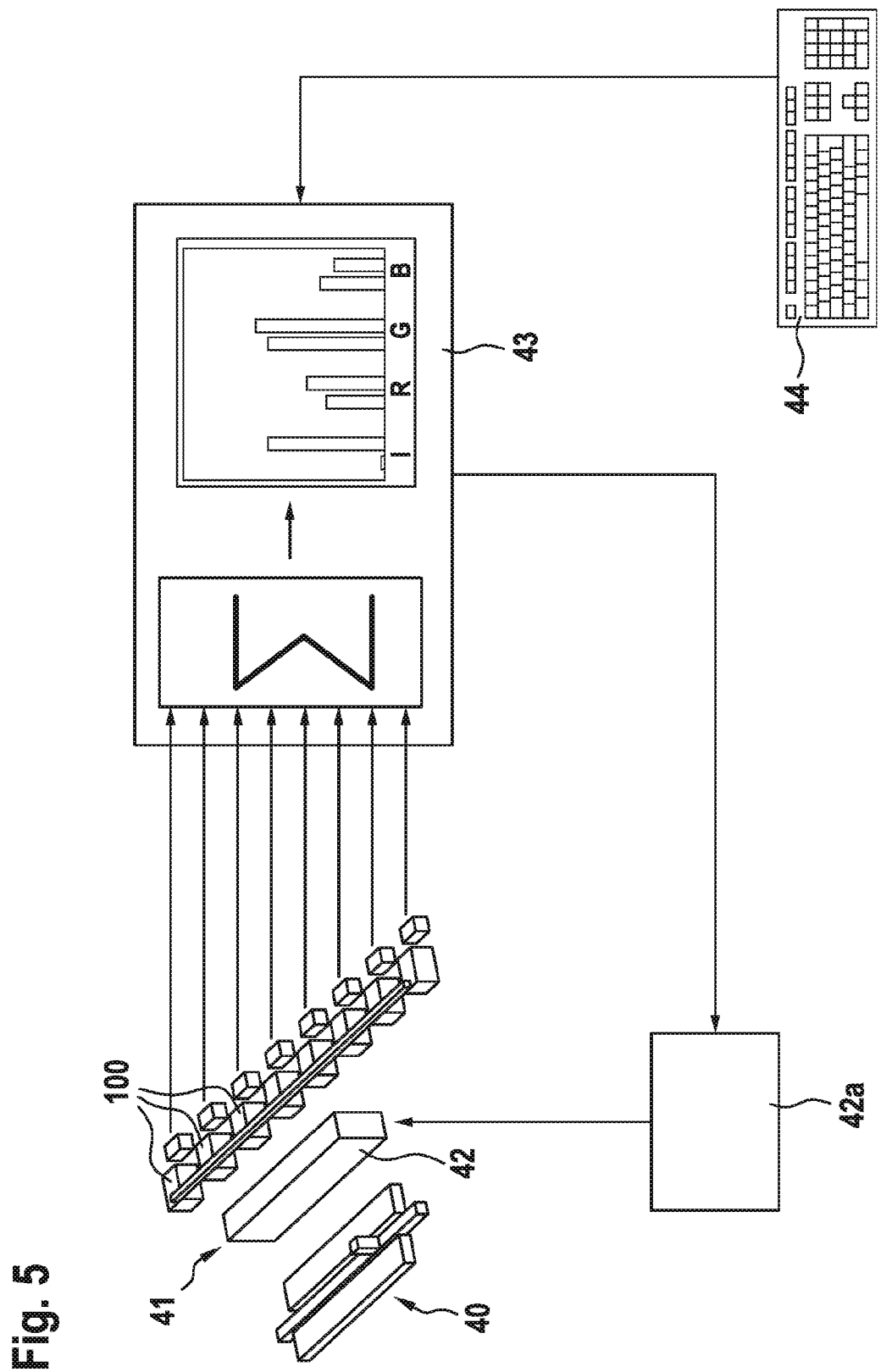
FIG. 5 is a spinning mill preparation installation with an arrangement of several cards with a device for combining and evaluation data.

For reducing said process, the invention suggests combining and evaluating together the data of the sensors 30 from the web guiding elements 20 of at least one card 100 in a control 43. FIG. 5 shows a bale opener 40, which opens a batch of fibre bales and feeds individual fibre tufts to a blow room 41. Within the blow room 41, which is upstream from the at least one card 100, the fibre tufts are loosened, are subject to a first cleaning and blending of fibres, as well as separating foreign parts (plastic material, packaging material, stalks, metal, etc.) in a foreign parts separator 42. Non-illustrated fibre transport lines feed the fibre tufts in the upstream blow room 41 to the cards 100. A superordinate control 43 adds up the individual data of the sensors 30 from the web guiding elements 20 of the individual cards 100 (see FIGS. 2 and 3) and evaluates them according to different criteria. The evaluation can refer to the proportion of short fibres or refer to foreign parts or refer to the number of neps or knots or characteristics such as cloudiness, thin/thick spots or fibre orientation. A display is formed for illustrating different fibre types as well as foreign parts, neps or dirt particles, for example. A specified waste quantity or extraction rate can be input via an input module 44, so that optimizing the data can be done already within the control 43. The control 43 transmits the new specification optimized data to the control 42*a*. of the foreign parts separator 42, which thereby, depending on the quality requirements and start material, can be set finer or coarser. The target is optimizing the setting so that the required quality of the start material (fibre web) of the card is. reached and kept. In this case, the sensitivity setting of the foreign parts separator 42 cannot be selected so high that a useless amount of waste is produced to no avail. For this purpose, it is required only to modify the parameters of the sensitivity setting, which are required for recognizing exactly said foreign parts, which, following the foreign parts separator 42, the sensors 30 in the web guiding elements 20 currently still detect in the card. This is achieved in that the data combined in the control 43, in addition to the number of foreign parts, also contain properties such as colour, size, contour, texture, type or surface quality. Then, in a targeted manner, the control 42a of the foreign parts separator 42 can optimize the required parameters. In case the control 43 still detects many red foreign parts, however almost no green ones, the sensitivity parameters for recognizing the colour red is optimized in the control 42, whereas the parameter for the colour green remains unchanged or is even operated at a lower sensitivity setting, so that the overall separation rate and thus the overall waste quantity stays within the specified values.

Combining the data of the sensors 30 from the web guiding elements of several cards 100 in the control 43 shortens the time for capturing the required number of images and reduces the time for processing the data. As a result, with three sensors per web guiding element and card, the foreign parts recognition can detect faulty fibre web after three hours, with five sensors per web guiding element and card after two hours, and with nine sensors per web guiding element and card after one hour. Thereby, a potential faulty card production can be stopped at an early stage prior to starting further processing in the following spinning mill.

Combining the data of the sensors 30 from the web guiding elements 20 from at least two cards in the control 43 results in yet another advantage. In case the control 43 determines that the data of the web guiding elements 20 change simultaneously or similarly in all cards, it can be assumed that this has a common cause, such as a change in the raw material, change at one or more machines or blow room lines or a common change in the processing conditions, such as temperature or humidity in the spinning mill preparation. However, if the change is observed at only one card, the cause is probably found at said card. Therefore, comparing data of at least two cards in the control 43 can serve for better determining which machine needs intervention for achieving the desired quality.

The invention claimed is:

1. A card having a doffer followed by a stripper roller and a device for recognizing interfering particle including trash parts, neps, shell neps, thick spots and/or foreign parts in a carded fibre web, the device comprising:
    a web guiding element adapted to be disposed at a transition from the doffer to the stripper roller, the web guiding element having a front side disposed towards the doffer and including at least one light-transmissible element;
    a polarizing filter disposed within the web guiding element at the light-transmissible element; and
    at least one sensor stationarily disposed in the web guiding element for detecting the interfering particles in the carded fibre web on the doffer.

2. The card according to claim 1, wherein the at least one sensor comprises at least three sensors stationarily disposed within the web guiding element.

3. The card according to claim 1, wherein each sensor includes a sensor board with a lens, the device further including a computer, a carrier board and an illumination unit disposed between the sensor board and the polarizing filter.

4. The card according to claim 3, wherein the computer is on a board and the lens penetrates the board with the computer, the carrier board and the illumination unit.

5. The card according to claim 3, wherein the carrier board is arranged and formed for shielding the computer and the sensor board from electromagnetic radiation.

6. A web guiding element formed for guiding the fibre web in a card, from a doffer to a stripper roll, the web guiding element comprising:
    four sides defining a hollow space, with one of the four sides comprising a front side disposed toward the doffer and including a light-transmissible element;
    a polarizing filter disposed within the web guiding element at the light-transmissible element; and
    at least one sensor stationarily disposed within the hollow space for detecting in a carded fibre web on the doffer interfering particles, including at least one of trash parts, neps, shell neps, thick spots and foreign parts.

7. A spinning mill preparation installation, comprising:
    at least one blow room or opening line with at least one controllable machine having a control input and being located upstream from at least one card having at least one sensor for detecting interfering particles including at least one of trash parts, neps, shell neps, thick spots and foreign parts in a carded fibre web, wherein the at least one sensor produces sensor data relating to the interfering particles; and a control arranged and adapted for receiving, combining and evaluating the sensor data, the control including an input for receiving at least one reference variable corresponding to fibre quality from an input module, and the control being operable for transmitting a modified variable to the control input of the of the controllable machine for adjusting a sensitivity setting of the controllable machine to control quality of the carded fibre web.

8. The spinning mill preparation installation according to claim 7, wherein the controllable machine comprises one of a foreign parts separator, a blender or a cleaner.

9. The spinning mill preparation installation according to claim 7, wherein the control is operable for issuing one of a visual, acoustic and electric signal for indicating a faulty carded fibre web.

10. A method of detecting and controlling interfering particles including at least one of trash parts, neps, shell neps, thick spots and foreign parts, in a carded fibre web output from at least one card, with at least one sensor disposed in the at least one card, comprising:
    combining data of the at least one sensor of the at least one card and performing an evaluation of the data in a control with respect to a reference variable; and
    employing the control to communicate the evaluation with to a control input of a controllable machine arranged upstream of a fibre input to the at least one card to control a sensitivity of the upstream controllable machine.

11. The method according to claim 10, wherein the upstream controllable machine is one of a foreign parts separator, a blender and a cleaner.

* * * * *